Oct. 31, 1967                    I. SMITH                    3,349,558
COMBUSTION APPARATUS, E.G. FOR A GAS TURBINE ENGINE
Filed March 28, 1966

United States Patent Office 3,349,558
Patented Oct. 31, 1967

3,349,558
COMBUSTION APPARATUS, e.g. FOR A
GAS TURBINE ENGINE
Ian Smith, Derby, England, assignor to Rolls-Royce
Limited, Derby, England, a British company
Filed Mar. 28, 1966, Ser. No. 537,812
Claims priority, application Great Britain, Apr. 8, 1965,
15,034/65
5 Claims. (Cl. 60—39.65)

ABSTRACT OF THE DISCLOSURE

Combustion apparatus comprises a fluid duct, having a wall which is formed with a multiplicity of pores whose diameter is in the range 5 to 300 microns, so that cooling air may pass to the interior surface of the wall. There is also a corrugated annular member forming, with the fluid duct, a series of compartments which communicate with the space between the casing structure and the fluid duct to different extents.

---

This invention concerns combustion apparatus, e.g. for a gas turbine engine.

According to the present invention, there is provided combustion apparatus comprising a fluid duct at least part of whose wall is formed with a multiplicity of pores whose maximum diameter does not exceed 400 microns, and combustion equipment mounted within said duct, the pores being adapted to permit the passage therethrough of cooling air for cooling the interior surface of the said wall, or of the said part thereof.

The pores preferably have a maximum diameter in the range 5 to 300 microns.

The said wall, or part thereof, of the or each flame tube may have a porosity of at least 15% and preferably not exceeding 40%.

The said wall, or part thereof, may comprise a single layer of mesh material or a number of layers of mesh material which have been compressed together. The mesh material, whether in the form of a single layer or in the form of a number of layers, may be backed, at the exterior surface of the said wall or part thereof, by sheet material having a plurality of drillings therethrough.

At the said interior surface, the pores are preferably so disposed adjacent each other and have a diffusing section such that cooling air flowing inwardly through the pores will substantially evenly cool the said interior surface.

The fluid duct may be a gas turbine engine jet pipe, the combustion equipment being reheat combustion equipment.

Alternatively, the fluid duct may be constituted by a flame tube of a gas turbine engine combustion chamber.

The wall of the flame tube is preferably provided with the said pores throughout its length.

The invention also comprises a gas turbine engine combustion chamber provided with at least one combustion apparatus as set forth above, the combustion chamber having casing structure within which is mounted and from which is spaced the or each said flame tube, means being provided for supplying fuel and combustion air to the interior of the or each flame tube and means being provided for supplying cooling air to the space between the casing structure and the or each flame tube, the said pores permitting the cooling air to pass therethrough to cool the interior surface of the said wall, or of the said part thereof.

Means are preferably provided for ensuring that the cooling air will enter the or each flame tube throughout its length. Thus the or each flame tube may be at least partly surrounded by a corrugated annular member which forms with the flame tube a series of axially spaced compartments which communicate with the said space to different extents.

Alternatively, or additionally, the porosity of the wall of the or each flame tube may be greater at its upstream than at its downstream end.

The invention also comprises a gas turbine engine provided with a combustion chamber as set forth above.

The invention is illustrated, merely by way of example, in the accompanying drawings, in which.

Figure 1:
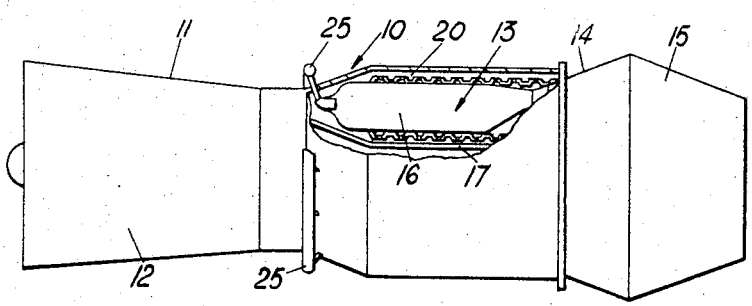
FIGURE 1 is a diagrammatic view, partly in section, of a gas turbine engine provided with a combustion chamber embodying the present invention.
Figure 2:
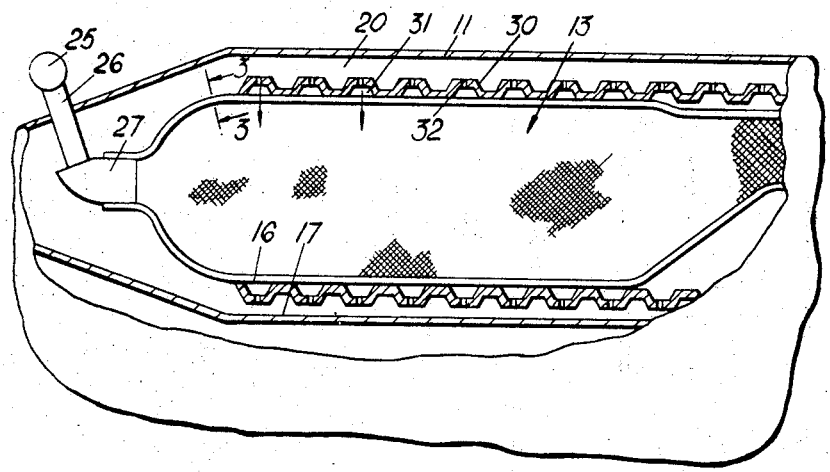
FIGURE 2 is a part sectional view showing part of the structure of FIGURE 1 on a larger scale.

Referring to the drawings, a gas turbine engine 10 has an engine casing 11 within which there are mounted, in flow series, a compressor 12, a combustion chamber 13, a turbine 14, and an exhaust duct 15. The gas turbine engine 10 may, for example, be a vertical lift engine, i.e. an engine adapted to produce vertical lift forces on an aircraft independently of those generated aerodynamically by forward flight of the aircraft. For this purpose, it may have a thrust to weight ratio of at least 8:1 and preferably of at least 16:1.

The combustion chamber 13 comprises a plurality of angularly spaced apart flame tubes 16 (only one shown), each of which is disposed between the engine casing 11 and an inner casing 17, each flame tube 16 being spaced by a space 20 from the casings 11, 17.

Figure 3:
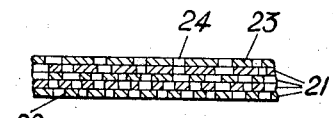
FIGURE 3 is a section taken on the line 3—3 of FIGURE 2.

Each of the flame tubes 16 is formed throughout its length of a wall which has been made by compressing together a plurality of layers 21 (FIGURE 3) of mesh material such as a nickel based alloy, e.g. one marketed under the Registered Trademark Nimonic. The compression of the layers 21 forms the holes in the mesh material thereof into pores 22 whose maximum diameter does not exceed 400 microns and is preferably in the range 5 to 300 microns. The advantages of such a pore size is that the lower limit of 5 microns is the smallest size at which blockage due to dust particles will not occur, while the upper limit of 300 microns sufficiently limits the amount of cooling air flowing into the flame tube at a given pressure difference and is just small enough to reduce turbulence, which is detrimental to cooling, to an acceptable level. The pores 22 give the assembly of layers 21 a porosity in the ranges of 15–40%.

The layers 21 may, as shown, be backed at the exterior surface of the wall of each of the flame tubes 16 by a layer of sheet metal 23 having a plurality of drillings 24 therethrough. Alternatively a single layer 21 may be employed which is backed by a sheet metal layer 23. The sheet metal layer 23 may, if desired, be bonded to the layer or layers 21 by a sintering operation. The drillings 24 may be arranged to diminish the amount of air which otherwise pass through the said wall, and the arrangement may be such that the porosity of each of the flame tubes 16 is greatest at its upstream end and is least at its downstream end. This enables cooling air to pass through the flame tubes 22 throughout their length.

Mounted about the exterior of the engine casing 11 is an annular fuel manifold 25 which communicates with a plurality of angularly spaced apart fuel ducts 26 through each of which fuel is supplied to the interior of a respective flame tube 16. Fuel which has passed through a fuel duct 26 flows through the centre of a swirl device 27 which is mounted at the upstream end of the respective flame tube 16, the swirl device 27 receiving combustion air from the compressor 12.

The space 20 receives cooling air from the compressor 12, and this cooling air will pass through the pores 22 so as to cool the interior surface of the wall of the respective flame tube 16. As will be seen from FIGURE 3, at the interior surface of each of the flame tubes 16, the pores 22 are so disposed adjacent each other and have a cross-section (not shown) such that cooling air is diffused whilst flowing inwardly through the pores and as a result the said interior surface is substantially evenly cooled by the cooling air.

If the flame tubes 16 are not provided with sheet metal 23, a corrugated annular member 30 is mounted in the space 20 about each flame tube 16 so as to form therewith a series of axially spaced compartments 31 each of which has an aperture 32 communicating with the space 20. By making the apertures 32 of different sizes, so that the compartments 31 communicate with the space 20 to different extents, cooling air will enter each of the flame tubes 16 throughout its length. As will be appreciated, if no annular member 30 were provided, the pressure in the space 20 at the upstream end of the flame tubes 16 could be insufficient for the cooling air to enter the flame tubes at their downstream ends.

The construction shown in the drawings may thus be arranged to provide the flame tubes 16 with substantially evenly cooled interior surface throughout their lengths. This is, of course, not normally possible since the cooling of flame tubes is normally achieved by forming the flame tubes in telescoped sections between which cooling air is introduced. Cooling air is thus normally introduced only at a limited number of axially spaced regions and considerable temperature differentials thus tend to occur between the upstream and downstream ends of each such section. Moreover, in order to ensure that the temperature of the cooling air at the downstream end of such section is appropriate it is necessary to use large quantities of cooling air. Accordingly, the construction shown in the drawings also enbales the amount of cooling air which it is necessary to use to be much reduced.

I claim:

1. Combustion apparatus comprising casing structure and a fluid duct disposed within and spaced from the casing structure, at least part of the wall of said duct being formed with a multiplicity of pores whose maximum diameter is in the range 5 to 300 microns, combustion equipment mounted within said duct, a corrugated member which forms with the outer wall of the fluid duct a series of axially spaced annular compartments which communicate with the space between the casing structure and the fluid duct to different extents through port means of different sizes, the pores providing means to permit passage therethrough of cooling air for cooling the interior surface of at least part of the wall.

2. Combustion apparatus as claimed in claim 1 in which the said part of the duct wall has a porosity in the range 15% to 40%.

3. Combustion apparatus as claimed in claim 1 in which the said part of the duct wall comprises at least one layer of mesh material, said mesh material being backed, at the exterior surface of the said part, by sheet material having a plurality of drillings therethrough.

4. Combustion apparatus as claimed in claim 1 in which the pores have a cross-section such that cooling air is diffused whilst flowing inwardly through the pores substantially evenly cooling said interior surface.

5. A gas turbine engine combustion chamber as claimed in claim 1 in which the fluid duct is constituted by a flame tube of a gas turbine engine combustion chamber, the wall of the flame tube being provided with the said pores throughout its length to ensure that the cooling air will enter the flame tube throughout its length, the porosity of the said wall of the flame tube being greater at its upstream end than at its downstream end.

References Cited

UNITED STATES PATENTS

| | | | |
|---|---|---|---|
| 2,447,482 | 8/1948 | Arnold | 60—39.65 X |
| 2,504,106 | 4/1950 | Berger | 60—39.69 |
| 2,672,728 | 3/1954 | Stockdale | 60—39.65 |
| 2,941,759 | 6/1960 | Rice et al. | |

JULIUS E. WEST, *Primary Examiner.*